US009430423B2

(12) United States Patent
Yoo et al.

(10) Patent No.: US 9,430,423 B2
(45) Date of Patent: Aug. 30, 2016

(54) EMBEDDED MULTIMEDIA CARD (EMMC), HOST CONTROLLING EMMC, AND METHOD OPERATING EMMC SYSTEM

(71) Applicant: SAMSUNG ELECTRONICS CO., LTD., Suwon-Si, Gyeonggi-Do (KR)

(72) Inventors: Kyung Phil Yoo, Seoul (KR); Jin Hyeok Choi, Yongin-Si (KR); Seong Sik Hwang, Seoul (KR); Young Gyu Kang, Yongin-Si (KR); Jung Pil Lee, Hwaseong-Si (KR); Sung Ho Seo, Seoul (KR); Myung Sub Shin, Suwon-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 386 days.

(21) Appl. No.: 14/025,909

(22) Filed: Sep. 13, 2013

(65) Prior Publication Data

US 2014/0082250 A1 Mar. 20, 2014

(30) Foreign Application Priority Data

Sep. 14, 2012 (KR) ........................ 10-2012-0102466

(51) Int. Cl.
*G06F 13/00* (2006.01)
*G06F 13/28* (2006.01)
*G06K 19/07* (2006.01)
*G06K 19/077* (2006.01)

(52) U.S. Cl.
CPC ............... *G06F 13/28* (2013.01); *G06K 19/07* (2013.01); *G06K 19/07732* (2013.01)

(58) Field of Classification Search
CPC . G06F 13/28; G06K 19/07732; G06K 19/07
USPC .................................................. 710/307, 308
See application file for complete search history.

(56) References Cited

U.S. PATENT DOCUMENTS

| | | | |
|---|---|---|---|
| 7,149,127 B2 | 12/2006 | Kikuchi | |
| 8,307,151 B1 * | 11/2012 | Caraccio ............. | G06F 12/0223 711/103 |
| 8,745,288 B2 * | 6/2014 | Na ....................... | G11C 7/1012 370/351 |
| 9,134,750 B2 * | 9/2015 | Kang ........................ | G06F 1/10 |
| 2005/0185463 A1 | 8/2005 | Kanamori et al. | |
| 2006/0026315 A1 | 2/2006 | Hong et al. | |
| 2009/0094678 A1 * | 4/2009 | Floman ............ | G06K 19/07309 726/2 |
| 2010/0274933 A1 | 10/2010 | Wang | |
| 2010/0332701 A1 | 12/2010 | Murayama | |
| 2014/0082404 A1 * | 3/2014 | Kang ........................ | G06F 1/10 713/503 |

FOREIGN PATENT DOCUMENTS

| | | |
|---|---|---|
| JP | 2003036202 | 2/2003 |
| JP | 2005275653 | 10/2005 |
| JP | 2006092266 | 4/2006 |
| KR | 20060080388 A | 7/2006 |

* cited by examiner

*Primary Examiner* — Tammara Peyton
(74) *Attorney, Agent, or Firm* — Volentine & Whitt, PLLC

(57) ABSTRACT

An eMMC includes flash memory including an extended card specific data (CSD) register ("EXT_CSD register"), and an eMMC controller that controls operation of the flash memory. The eMMC controller is receives a clock from a host via a clock line, receives a SEND_EXT_CSD command from the host via a command line, and provides the host with eMMC information stored in the EXT_CSD register via a data bus in response to the SEND_EXT_CSD command, the eMMC information including maximum operating frequency information for the eMMC.

17 Claims, 15 Drawing Sheets

FIG. 2

| CMD INDEX | Type | Argument | Resp | Abbreviation | Command Description |
|---|---|---|---|---|---|
| ⋮ | ⋮ | ⋮ | ⋮ | ⋮ | ⋮ |
| CMD6 | ac | [31:26] Set to 0<br>[25:24] Access<br>[23:16] Index<br>[15:8] Value<br>[7:3] Set to 0<br>[2:0] Cmd Set | R1b | SWITCH | Switches the mode of operation of the selected Device or modifies the EXT_CSD registers. (See Section 6.6.1) |
| CMD7 | ac | [31:16] RCA<br>[15:0] stuff bits | R1/R1b1 | SELECT/ DESELECT_CARD | Command toggles a device between the standby and transfer states or between the programming and disconnect states. In both cases the Device is selected by its own relative address and gets deselected by any other address; address 0 deselects the Device. |
| CMD8 | adtc | [31:0] stuff bits | R1 | SEND_EXT_CSD | The Device sends its EXT_CSD register as a block of data. |
| ⋮ | ⋮ | ⋮ | ⋮ | ⋮ | ⋮ |
| CMD21 | adtc | [31:0] stuff bits | R1 | SEND_TUNING_ BLOCK | 128 clocks of tuning pattern (64byte in 4 bit mode or 128byte in 8 bit mode) is sent for HS200 optimal sampling point detection |
| ⋮ | ⋮ | ⋮ | ⋮ | ⋮ | ⋮ |

FIG. 6

| Bit | Device Type |
|---|---|
| 7 | DDR400 Dual Data Rate e·MMC @ 200 MHz – 1.2V I/O |
| 6 | DDR400 Dual Data Rate e·MMC @ 200 MHz – 1.8V I/O |
| 5 | HS200 Single Data Rate e·MMC @ 200 MHz – 1.2V I/O |
| 4 | HS200 Single Data Rate e·MMC @ 200 MHz – 1.8V I/O |
| 3 | High-Speed Dual Data Rate e·MMC @ 52 MHz – 1.2V I/O |
| 2 | High-Speed Dual Data Rate e·MMC @ 52 MHz – 1.8V or 3V I/O |
| 1 | High-Speed e·MMC @ 52 MHz – at rated device voltage(s) |
| 0 | High-Speed e·MMC @ 26 MHz – at rated device voltage(s) |

FIG. 7A

HS_TIMING(timing and driver strength)

| Bit 7 | Bit 6 | Bit 5 | Bit 4 | Bit 3 | Bit 2 | Bit 1 | Bit 0 |
|---|---|---|---|---|---|---|---|
| Selected Driver Strength | | | | Timing Interface | | | |

FIG. 7B

HS_TIMING values

| Value | Timing Interface | Remarks |
|---|---|---|
| 0x0 | Selecting backwards compatibility interface timing | |
| 0x1 | High Speed | |
| 0x2 | HS200 | |
| 0x3 | DDR400 | |

Note1: $t_{ISU}$ and $t_{IH}$ are measured at $V_{IL}$(max.) and $V_{IH}$(min.).
Note2: $V_{IH}$ denote $V_{IH}$(min.) and $V_{IL}$ denotes $V_{IL}$(max.).

FIG. 9

| Parameter | | Symbol | Min | Max. | Unit | Remark |
|---|---|---|---|---|---|---|
| Input CLK | | | | | | |
| Cycle time data transfer mode | | $t_{PERIOD}$ | 5 | – | ns | 200MHz(Max.), between rising edges |
| Clock high time | | $t_{WH}$ | 1.5 | | ns | $C_{BGA} \leq 6pF$ |
| Clock low time | | $t_{WL}$ | 1.5 | | ns | $C_{BGA} \leq 6pF$ |
| Clock rising/falling time | | $t_{TLH}, t_{THL}$ | – | $0.2 \cdot t_{PERIOD}$ | ns | tTLH, tTHL<1ns(max.)at 200MHz, $C_{BGA}$=6pF, The absolute maximum value of tTLH, tTHL is 10ns regardless of clock frequency. |
| Clock duty cycle | | | 47.5 | 52.5 | % | Includes jitter, phase noise |
| Input DAT (referenced to CLK) | | | | | | |
| 333MHz | Input set-up time | tISUddr | 0.5 | | ns | $4pF \leq C_{BGA} \leq 6pF$ |
| | Input hold time | tIHddr | 0.5 | | ns | $4pF \leq C_{BGA} \leq 6pF$ |
| 400MHz | Input set-up time | tISUddr | 0.4 | | ns | $4pF \leq C_{BGA} \leq 6pF$ |
| | Input hold time | tIHddr | 0.4 | | ns | $4pF \leq C_{BGA} \leq 6pF$ |

Note: $V_{OH}$ denotes $V_{OH}$(min.) and $V_{OL}$ denotes $V_{OL}$(max.).

FIG. 11

| Parameter | | Symbol | Min | Max. | Unit | Remark |
|---|---|---|---|---|---|---|
| Output CLK | | | | | | |
| Cycle time data transfer mode | | $t_{PERIOD}$ | 5 | – | ns | 200MHz(Max.), between rising edges |
| RCLK high time | | $t_{RWH}$ | 1.5 | | ns | $C_{BGA} \leq 6pF$ |
| RCLK low time | | $t_{RWL}$ | 1.5 | | ns | $C_{BGA} \leq 6pF$ |
| Clock rising/falling time | | $t_{TLH}, t_{THL}$ | – | $0.2 \cdot t_{PERIOD}$ | ns | tTLH, tTHL<1ns(max.)at 200MHz, $C_{BGA}$=6pF, The absolute maximum value of tTLH, tTHL is 10ns regardless of clock frequency. |
| Clock duty cycle | | | 45 | 55 | % | Includes jitter, phase noise |
| Output DAT (referenced to RCLK) | | | | | | |
| 333MHz | Output hold skew | tRQ | 0.5 | | ns | $4pF \leq C_{BGA} \leq 6pF$ |
| | Output hold time | tRQH | 0.5 | | ns | $4pF \leq C_{BGA} \leq 6pF$ |
| 400MHz | Output hold skew | tRQ | 0.4 | | ns | $4pF \leq C_{BGA} \leq 6pF$ |
| | Output hold time | tRQH | 0.4 | | ns | $4pF \leq C_{BGA} \leq 6pF$ |

FIG. 12

| Type | DDR Max Freq | Remark |
|---|---|---|
| 0 | 52MHz | Support up to 52MHz operation |
| 1 | 100MHz | Support up to 100MHz operation |
| 2 | 133MHz | Support up to 133MHz operation |
| 3 | 166MHz | Support up to 166MHz operation |
| 4 | 200MHz | Support up to 200MHz operation |

EMBEDDED MULTIMEDIA CARD (EMMC), HOST CONTROLLING EMMC, AND METHOD OPERATING EMMC SYSTEM

CROSS-REFERENCE TO RELATED APPLICATIONS

This application claims priority under 35 U.S.C. §119 to Korean Patent Application No. 10-2012-0102466 filed on Sep. 14, 2012, the subject matter of which is hereby incorporated by reference.

BACKGROUND

The inventive concept relates to embedded Multimedia Card (eMMC), and more particularly, to eMMC capable of changing clock frequency without performing a clock tuning process. The inventive concept relates to hosts controlling this type of eMMC, as well as methods operating a eMMC systems including this type of eMMC.

The so-called multimedia card (MMC) is a flash memory card standard. The eMMC is an embedded MMC standard defined by the Joint Electron Devices Engineering Council (JEDEC). In general configuration and application eMMCs are designed to be inserted (or "embedded") in conjunction with a host within mobile communication devices such as smart phones. Conventionally, the eMMC communicates data signals, control signals, commands, clock(s) and/or power signals with the connected host in accordance with a standardize 10-signal bus.

In eMMC systems including a host and eMMC, the host provides the eMMC with a reference (or system) clock signal. In certain embodiments, the clock being provided by the host to the eMMC must be variably defined in its frequency (or clock speed). In order to provide a clock to the eMMC with an appropriate frequency, the host may conventionally perform a specialized procedure referred to as a "tuning process." The tuning process is used, for example, when increasing the frequency of the clock provided by a host to an eMMC. However, execution of the tuning process increases the eMMC management overhead that must be performed by the host.

SUMMARY

Certain embodiments of the inventive concept provide an embedded Multimedia Card (eMMC) including a command channel that receives a SEND_EXT_CSD command from a host, data channels that communicate maximum operating frequency information for the eMMC to the host in response to the SEND_EXT_CSD command, and a clock channel that receives a clock signal having a frequency defined in accordance with the maximum operating frequency information. In certain more specific embodiments of the inventive concept, the maximum operating frequency information may be stored in a designated "VENDOR_SPECIFIC_FIELD" field of a EXT_CSD register located in the eMMC.

Certain embodiments of the inventive concept provide a host having a command channel that communicates the SEND_EXT_CSD command to an eMMC. This type of command may be used to read data from a particular register (e.g., the EXT_CSD register) corresponding to eMMC information and including maximum operating frequency information for the eMMC. The host also includes data channels that may be used to receive the maximum operating frequency information from the eMMC, and a clock channel that communicates a clock having a frequency defined in accordance with the maximum operating frequency information for the eMMC. In certain embodiments of the inventive concept, the host further includes a clock generator that generates the clock having the variably defined frequency.

In one embodiment, the inventive concept provides an eMMC including; flash memory including an extended card specific data (CSD) register ("EXT_CSD register"), and an eMMC controller that controls operation of the flash memory. The eMMC controller is configured to receive a clock from a host via a clock line, receive a SEND_EXT_CSD command from the host via a command line, and provide the host with eMMC information stored in the EXT_CSD register via a data bus in response to the SEND_EXT_CSD command, the eMMC information including maximum operating frequency information for the eMMC.

In another embodiment, the inventive concept provides an eMMC system including an eMMC having flash memory and an extended card specific data (CSD) register ("EXT_CSD register") that stores information including maximum operating frequency information for the eMMC, and a host that controls the operation of the eMMC. The host includes; a clock generator that generates a clock provided to the eMMC, and a host controller that generates a maximum operating frequency control signal applied to the clock generating to determine a frequency of the clock, wherein the host controller is configured to send a SEND_EXT_CSD command to the eMMC and receive the maximum operating frequency information from the eMMC in response to the SEND_EXT_CSD command, and the maximum operating frequency control signal is generated in accordance with the maximum operating frequency information.

In another embodiment, the inventive concept provides a method of operating an eMMC system including an embedded multimedia card (eMMC) and a host. The method includes; providing a clock having a first frequency from the host to the eMMC, communicating a SEND_EXT_CSD command from the host to the eMMC, in response to the SEND_EXT_CSD command, reading information data from an extended card specific data (CSD) register ("EXT_CSD register") disposed in the eMMC and communicating the information data to the host, and changing the frequency of the clock from the first frequency to a second frequency different from the first frequency.

BRIEF DESCRIPTION OF THE DRAWINGS

FIG. 2 is a table of commands that may be used by the host of the eMMC system of FIG. 1 to control the operation of an eMMC;

FIG. 6 is a table listing possible device types having corresponding operating modes for the eMMC of certain embodiments of the inventive concept;

FIG. 7, inclusive of FIGS. 7A and 7B, illustrates HS_TIMING and related values of HS_TIMING according to certain embodiments of the inventive concept;

FIG. 9 is a table listing parameters corresponding to the DDR 400 device input timing diagram of FIG. 8;

FIG. 11 is a table listing parameters corresponding to the DDR 400 device input timing diagram of FIG. 10.

FIG. 12 is a table listing possible information that may define a maximum operating frequency in DDR 400 mode that may be stored in a VENDOR_SPECIFIC_FIELD field of an Extended CSD register of an eMMC consistent with certain embodiments of the inventive concept.

DETAILED DESCRIPTION

Figure 1:
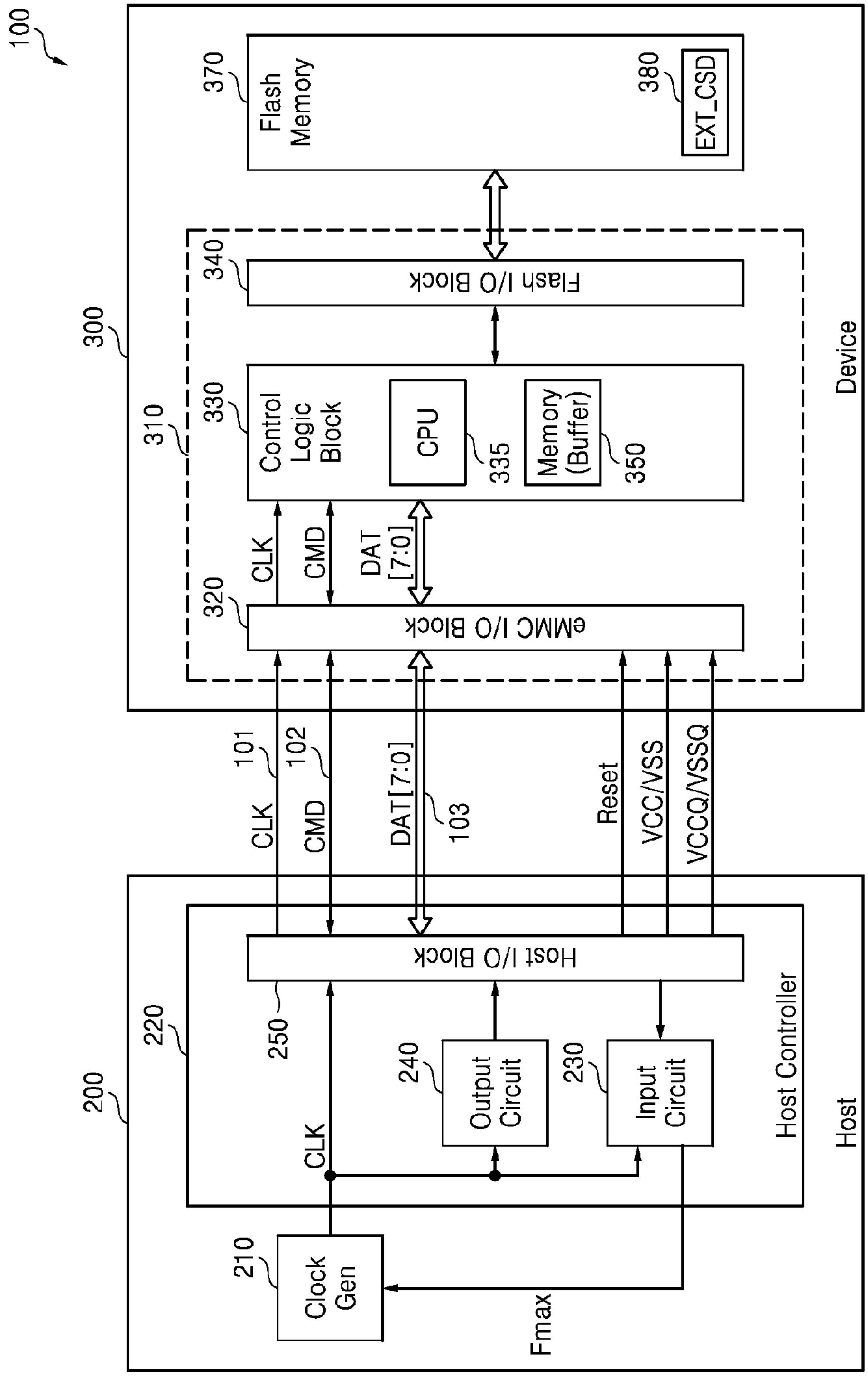
FIG. 1 is a block diagram of a eMMC system including an embedded Multimedia Card (eMMC) and host according to an embodiment of the inventive concept.

Embodiments of the inventive concept will now be described in some additional detail with reference to the accompanying drawings. The inventive concept may, however, be embodied in many different forms and should not be construed as limited to only the illustrated embodiments. Rather, these embodiments are provided so that this disclosure will be thorough and complete, and will fully convey the scope of the invention to those skilled in the art. Throughout the drawings and written description, like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Those skilled in the art will understand that various JEDEC standards are available that characterize and/or define the structure, constitution and/or operating conditions of eMMCs. These standards may be readily obtained and consulted by recourse to http://www.jedec.org. For example, the embedded multimedia card (eMMC) electrical standard, version 4.51 published June 2012 (i.e., JESD84-B451) contains many terms and technical definitions that are useful to an understanding of the inventive concept.

Various embodiments of the inventive concept may include at least one "additional" signal line or signal wire (hereafter, simply "line") having a specific purpose. This additional line will be additive to the standard 10-wire configuration(s) specified by JEDEC. In this regard, pending U.S. patent application Ser No. 14/025,879 filed on Sep. 13, 2013 is hereby incorporated by reference.

As will be appreciated by those skilled in the art, a host in an eMMC system may be used to control the data processing (or access) operations (e.g., read/write operations) of an eMMC. Such data processing operations may be performed at a single data rate (SDR) or double data rate (DDR). In certain embodiments of the inventive concept, the provision of an additional line increases noise immunity and improves transmission speed for data communicated between the host and eMMC during data read operations while operating in a dual data rate (DDR) mode. Those skilled in the art will understand the general technical concepts and design options involved in providing a DDR mode of operation—specifically including so-called "DDR400".

Within various embodiments of the inventive concept, the term "channel" is used to denote a signal path enabling the transmission of one or more electrical signal(s) (e.g., a voltage). As will be understood by those skilled in the art, a channel may include one or more of; circuits acting upon the one or more electrical signal(s), a host pad (and/or pin), an eMMC pad (and/or pin), a line (or collection of lines), a driver—specifically including but not limited to certain differential amplifiers, and a receiver—specifically including but not limited to certain differential amplifiers. Various functions phenomena will be ascribed to channel(s) in the written description that follows.

FIG. 1 is a block diagram of an eMMC system 100 including an embedded Multimedia Card (eMMC) and a host according to an embodiment of the inventive concept. Referring to FIG. 1, the eMMC system 100 includes a host 200 and a device 300 (e.g., an eMMC) 300. The host 200 may be a microprocessor or an application processor capable of being embedded or embodied in an electronic device, such as a personal computer (PC), laptop computer, mobile phone, smartphone, table PC, personal digital assistant (PDA), enterprise digital assistant (EDA), digital still camera, portable multimedia player (PMP), personal navigation device or portable navigation device (PND), MP3 player, handheld game console, or e-book.

The eMMC 300 may be connected with the host 200 within the electronic device using various connection methods and structures (e.g., pads, pins, bus, lines, channels, etc.). In the embodiment if FIG. 1, a conventional eMMC configuration is assumed, wherein the eMMC 300 and host 200 are connected by ten (0) signal lines, including a unidirectional clock CLK line 101, a bidirectional command/response line 102, and a data bus [7:0] configured from eight (8) data lines 103. The eMMC 300 and host 200 are further connected via power lines VCC/VSS and VCCQ/VSSQ, as well as a reset line.

With this configuration, the host 200 may provide I/O operating voltages VCCQ and VSSQ used by the input circuit 230 and output circuit 240 of the host controller 220 to the eMMC 300 via the I/O operation voltage power line VCCQ/VSSQ. The host 200 may also provide core operation voltages VCC and VSS to the flash memory 370 of the eMMC 300 via the core operation voltage power line VCC/VSS. In certain embodiments of the inventive concept, the operating voltage VSSQ and the core operation voltage VSS are ground voltages.

The host 200 illustrated in FIG. 1 includes a clock generator 210 and a host controller 220. The clock generator 210 may be used to generate a clock signal CLK ("clock") that may be used by the host 200 and/or the eMMC 300. In many embodiments of the inventive concept, the provision of the clock CLK to the eMMC 300 by the host 200 is mandatory to the functioning of the eMMC 300. In certain more specific embodiments of the inventive concept, the clock generator 210 may be embodied as a phase locked loop (PLL) circuit.

Recognizing the foregoing, an eMMC consistent with certain embodiments of the inventive concept must be provided by a clock CLK having a frequency that is defined in accordance with an operating mode for the eMMC 300. That is, different eMMC operating modes will transfer data according to different data transfer rates (or bus speeds). Table 1 below lists certain eMMC modes of operation, together with operating parameters including a maximum data transfer rate (Max Data Rate).

TABLE 1

| Mode | Data Rate | I/O Voltage | Bus Width | Frequency | Max Data Rate |
|---|---|---|---|---|---|
| Backward Compatibility w/ legacy MMC | Single | 3.0/1.8/1.2 V | 1, 4, 8 | 0-26 MHz | 26 MB/s |
| High Speed SDR | Single | 3.0/1.8/1.2 V | 4, 8 | 0-52 MHz | 52 MB/s |
| High Speed DDR | Dual | 3.0/1.8/1.2 V | 4, 8 | 0-52 MHz | 104 MB/s |
| HS200 | Single | 1.8/1.2 V | 4, 8 | 0-200 MHz | 200 MB/s |

Drawings upon the operating modes listed in Table 1, as examples, the eMMC 300 of FIG. 1 will require a clock CLK having a frequency of up to 200 MHz in order to operate in the HS200 mode. Conventionally, this HS200 clock requirement was met by performing a tuning process using the host 200. The tuning process performed by the host 200 may begin with the communication of a Send Tuning Block command (e.g., CMD 21) from the host 200 to the eMMC 300. But as noted above, the tuning process is additional overhead for the host 200.

Returning to FIG. 1, the host controller 220 includes an input circuit 230, an output circuit 240, and a host input/output (I/O) block 250.

During a read operation, the input circuit 230 receives "read data" retrieved from a flash memory 370 through the host I/O block 250. The read operation may be performed under the control of the host 200 after the input circuit 230 receives a "maximum operating frequency control signal" Fmax providing maximum operating frequency information for the eMMC 300. In certain embodiments of the inventive concept, the maximum operating frequency information will be stored in an extended card specific data (CSD) register (an EXT_CSD register) 380 associated with the flash memory 370. A EXT_CSD register is conventionally provided in many eMMC. In turn, the input circuit 230 communicates the maximum operating frequency control signal Fmax derived from the maximum operating frequency information to the clock generator 210, and the clock generator 210 may be used to generate the clock CLK having an appropriate frequency determined in accordance with the maximum operating frequency information which is operating mode specific for the eMMC 300.

During a write operation, the output circuit 240 may be used to communicate "write data" to be written to the flash memory 370 of the eMMC 300 by the host I/O block 250.

The eMMC 300 includes a device (eMMC) controller 310 and the flash memory 370. The eMMC controller 310 controls data communication between the host 200 and the flash memory 370. The eMMC controller 310 of FIG. 1 includes an eMMC input/output (I/O) block 320, a control logic block 330, and a flash I/O block 340.

During the write operation, the eight bit data is received from the data bus 103 via the eMMC I/O block 320 and stored in a buffer memory 350 under the control of a Central Processing Unit (CPU) 335. Then, a flash I/O block 340 may be used to read the write data temporarily stored in the buffer memory 350.

During the read operation, the flash I/O block 340 may be used to store the read data provided by the flash memory 370 to the buffer memory 350 under the control of the CPU 335 and according to maximum operating frequency information provided from the EXT_CSD register 380.

Hence, the CPU 335 controls the overall operation of the eMMC I/O block 320 and the flash I/O block 340 during read/write operations. And the buffer memory 350 may be used to facilitate an exchange of read/write data between the eMMC I/O block 320 and the flash I/O block 340. The memory 350 may be implemented using a volatile memory, such as a Dynamic Random Access Memory (DRAM) of Static RAM (SRAM).

The flash memory 370 includes the EXT_CSD register 380, and the EXT_CSD register 380 may be used to store the maximum operating frequency information for the eMMC 300. For example, in certain embodiments of the inventive concept, the maximum operating frequency information may be stored in a particular field conventionally designated in the EXT_CSD register 380 as the "VENDOR_SPECIFIC_FIELD". When the flash memory 370 is implemented using NAND flash memory, the flash I/O block 340 may be a NAND flash I/O block.

FIG. 2 is a table listing certain commands that may be used by host 200 of FIG. 1 to control the operation of the eMMC system 100. Referring to FIGS. 1 and 2, the host 200 may conventionally communicate a command CMD to the eMMC 300 via the command line 102. Consistent with conventional definitions, a eMMC system command CMD may be defined using forty-eight (48) bits. One possible format is assumed for the example shown as Table 2.

TABLE 2

| Description | Start Bit | Transmission Bit | Command Index | Argument | CRC7 | End Bit |
|---|---|---|---|---|---|---|
| Bit position | 47 | 46 | [45:40] | [39:8] | [7:1] | 0 |
| Width (bits) | 1 | 1 | 6 | 32 | 7 | 1 |
| Value | "0" | "1" | x | x | x | "1" |

In the example shown in Table 2, the command CMD starts with the start bit (always, '0'). A transmission bit showing the transmission direction follows. The next six (6) bits indicates a command index, and a value of the command index is interpreted as a binary coded number (0 through 63). Certain commands require an argument (e.g., an address) which can be coded as 32 bits. An indication of "x" in Table 2 denotes a variable dependent on commands. All commands are assumed to be protected by cyclic redundancy code (CRC), and each command is terminated by an end bit.

Extending the example of FIGS. 1 and 2, the host 200 may communicate a SELECT command (CMD7) to the eMMC 300 in order to cause the eMMC 300 to transition from a stand-by state (stby) to a transfer state (trans). The SELECT command CMD7 is an address command (ac), where [31:16] among the arguments of the SELECT command CMD7 is allocated to a Relative Device Address (RCA) register and [15:0] is allocated to stuff bits. That is, [15:0] is filled with 0 bits.

The eMMC 300 may then communicate a first response R1 to the host 200 in response to the SELECT command CMD7. The first response R1 may be defined by 48 bits. One possible format example for the first response R1 is shown as Table 3.

TABLE 3

| Description | Start Bit | Transmission Bit | Content | CRC7 | End Bit |
|---|---|---|---|---|---|
| Bit position | 47 | 46 | [45:8] | [7:1] | 0 |
| Width (bits) | 1 | 1 | 38 | 7 | 1 |
| Value | "0" | "1" | x | x | "1" |

In the illustrated example, the first response R1 starts with the start bit (always, '0'). A transmission bit showing the transmission direction follows. The next 38 bits indicate content, such as state information. An "x" indication denotes a variable dependent on the first response R1. The first response R1 is protected by a CRC, and the first response R1 is terminated by an end bit.

In response to the first response R1, the host 200 may communicate a SEND_EXT_CSD command (CMD8) to the eMMC 300 in order to receive the maximum frequency information for the eMMC 300. In one possible format, the SEND_EXT_CSD command (CMD 8) is an address data transfer command (adtc), wherein [31:0] of the SEND_EXT_CSD command CMD8 arguments is allocated to stuff bits. That is, [31:0] is filled with 0 bits.

In response to the SEND_EXT_CSD command (CMD 8) from the host 200*m*, the eMMC 300 will return another first response R1 to the host 200 via the command line 102, and the maximum operating frequency information stored in the EXT_CSD register 380 may be communicated to the host 200 via the data bus 103. The maximum operating frequency information will include information defining a maximum operating frequency for the eMMC 300 given its current operating mode. In certain embodiments, the maximum operating frequency may be indicated by a few as 1 data bit.

Those skilled in the art will understand that the EXT_CSD register 380 may be used to store a variety of information related to the operating characteristics, modes and/or properties of the eMMC 300 and/or the flash memory 370. In certain embodiments of the inventive concept, the EXT_CSD register 380 may be used to store up to 512 bits of information data, and any one of these available bits may be used to indicate the maximum operating frequency. In certain embodiments of the inventive concept, the EXT_CSD register 380 will be disposed in the flash memory 370.

Next, the host 200 may communicate a SWITCH command (CMD 6) to the eMMC 300. The SWITCH command CMD 6 is also an address command (ac). And in response, the eMMC 300 may communicate a second response R1*b* (e.g., 48 bits) to the host 200. The format of the second response R1*b* may be the same as the first response R1. One possible example of a HS_TIMING [185] field within the EXT_CSD register 380 is bits 7 through 4 being used to define a selected driver strength, and bits 3 through 0 being used to define a timing interface. Here, the host 200 may set the bit value of the timing interface field as 2 by using the SWITCH command CMD 6 for selecting a eMMC or bus operating mode (e.g., the HS200 mode). Thus, an argument of the SWITCH command CMD6 may be [0×03B9_0100]. One detailed description of the selected drive strength field is described in JESD84-B451.

From the foregoing, it will be appreciate that the host 200 must provide a clock CLK having an appropriate frequency in relation to a selected operating mode for the eMMC 300. For example, if it is assumed that the HS200 mode has been selected for the eMMC 300, the host 200 must provide a relatively high frequency clock CLK up to 200 MHz. Also from the foregoing it should be understood that the host 200 may generate a clock CLK having a frequency defined in accordance with certain maximum operating frequency information provided from the eMMC 300. For example, when the maximum operating frequency for the eMMC 300 is given as 200 MHz by current maximum operating frequency information, the host 200 will generate the clock CLK at a frequency of 200 MHz, and communicate this clock CLK to the eMMC 300.

In this manner, the host 200 need not specifically perform a tuning process such as the type conventionally initiated by transmission of a SEND_TUNING_BLOCK command CMD21 from the host 200 to the eMMC 300. As a result, overhead is reduced.

Figure 3:
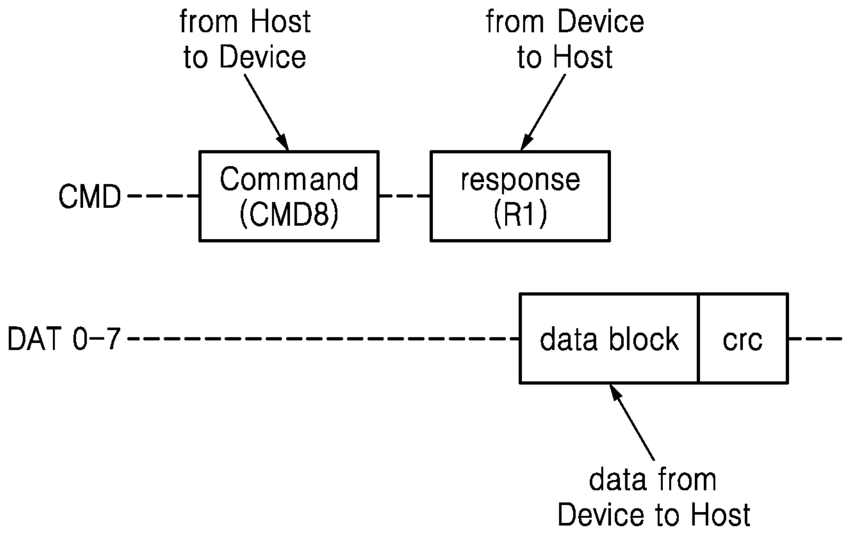
FIG. 3 is an operating diagram illustrating execution of a read operation by the eMMC system of FIG. 1.

FIG. 3 is an operating diagram illustrating execution of a read operation by the host 200 of FIG. 1. Referring to FIGS. 1, 2 and 3, the host 200 transmits the SEND_EXT_CSD command CMD8 to the eMMC 300 via the command line 102. The eMMC 300 then returns a first response R1 to the host 200, and communicates maximum operating frequency information stored in the EXT_CSD register 380 via the data bus 103. Alternately, the eMMC 300 may communicate the maximum operating frequency information to the host 200 as a response via the command bus 102.

Figure 4:
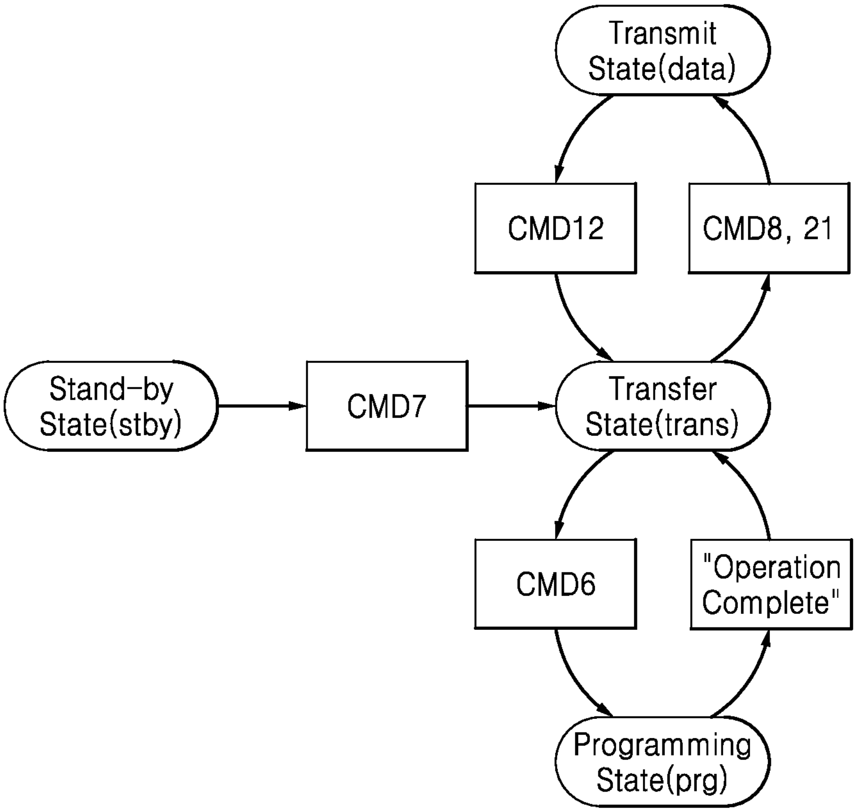
FIG. 4 is a state diagram illustrating the functional states and state transitions that may be used to control the eMMC of FIG. 1.

FIG. 4 is a state diagram for the eMMC 300 of FIG. 1. Referring to FIGS. 1, 2, 3, and 4, the eMMC 300 may transition from a stand-by state (stby) to the transfer state (trans) in response to the SELECT command CMD7 received from the host 200.

Next, once the eMMC 300 is in the transfer state (trans), it is assumed that the eMMC 300 receives a SEND_EXT_CSD command CMD8 from the host 200. In response to the SEND_EXT_CSD command CMD8, the eMMC 300 transitions from the transfer state (trans) to a data transmit state (data), and transmits maximum operating frequency information for the eMMC 300, for example, as part of a general information dump from the EXT_CSD register 380 of the eMMC 300 to the host 200. Following successful receipt of the information stored in the EXT_CSD register 380, the host 200 may communicate a command CMD 12 that causes the eMMC 300 to transition from the transmit state (data) to the transfer state (trans).

Next, the host 200 is assumed to communicate the SWITCH command CMD6 to the eMMC 300 in order to switch the operating mode of the eMMC 300. For example, in response to the SWITCH command CMD6, the eMMC 300 may transition from the transfer state (trans) to a programming state (prg). In the programming state (prg), the eMMC 300 is able to receive write data and store it in the flash memory 370. Once the programming operation is complete by the flash memory 370, the eMMC 300 may return back to the transfer state (trans).

In this manner, the eMMC 300 may, in response to a corresponding command received from the host 200, transition from a transfer (or idling) state (trans) to an operating mode that facilitates either a read operation (i.e., the transmit state) or a write operation (i.e., the programming state). Recognizing that different read/write operations may be performed at different speeds, the eMMC 300—while waiting in the transmit state (trans)—may receive from the host 200 a clock CLK having a frequency corresponding to the desired speed and as indicted by the maximum operating frequency information communicated from the eMMC 300.

Figure 5:
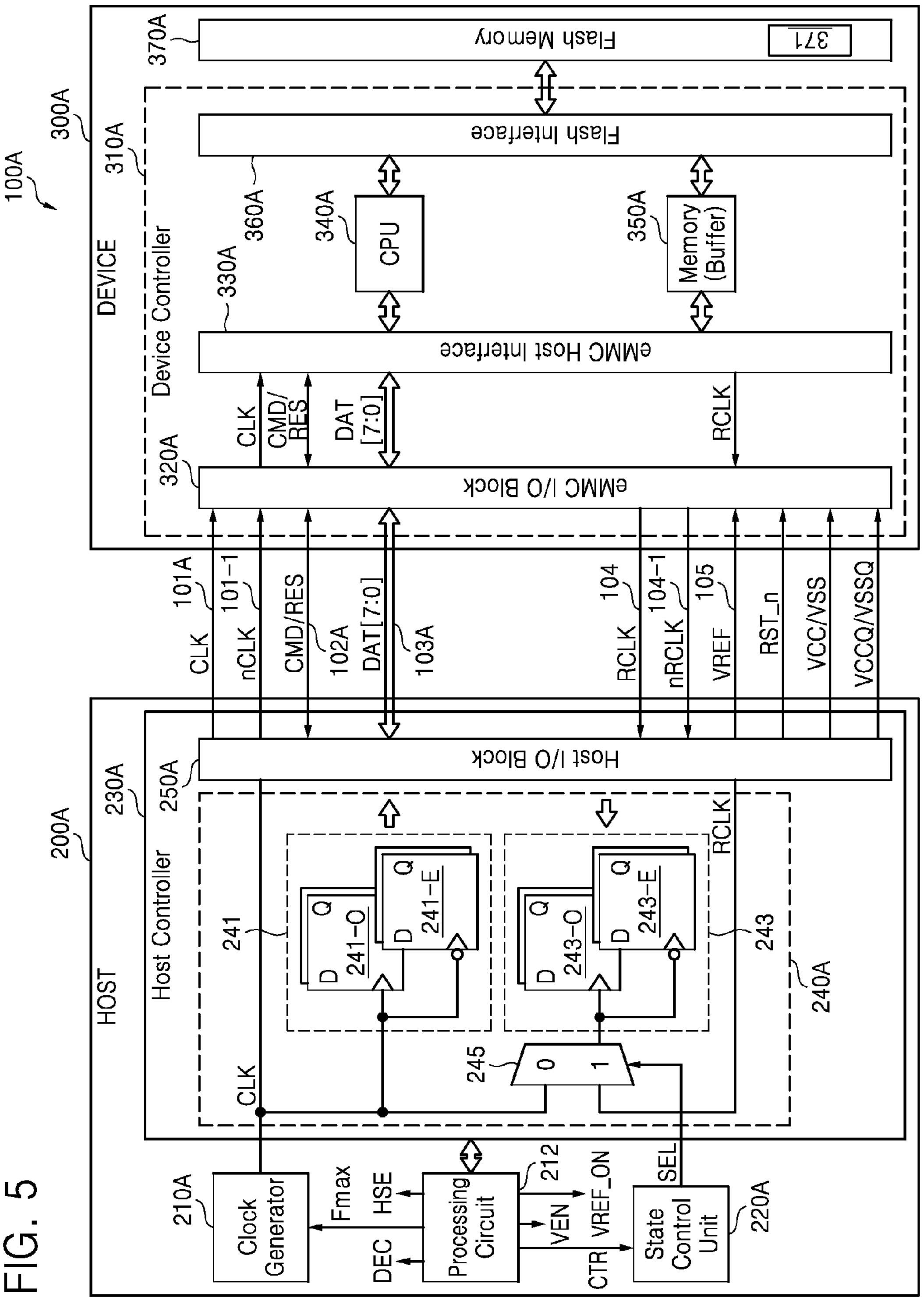
FIG. 5 is a block diagram of an eMMC system including an eMMC and a host according to another embodiment of the inventive concept.

FIG. 5 is a block diagram of an eMMC system according to another embodiment of the inventive concept. In the context described in relation to FIG. 5, certain embodiments of the inventive concept may essentially "redefine" the conventionally understood DDR 400 mode of operation. In the example of FIG. 5, it is assumed that the DDR 400 mode of operation enables a data exchange rate of 200 MHz dual date rate (DDR) using an input operating voltage VCCQ provided by the host 200 or eMMC 300 of 1.2V or 1.8V.

Referring to FIG. 5, the eMMC system 100A includes a host 200A and a device (eMMC) 300A. The structure and the function of the eMMC system 100A may be similar that of the eMMC system 100 previously described in relation to FIG. 1 except the eMMC system 100A specifically supports DDR 400.

The host 200A includes a clock generator 201A, a processing circuit 212, a state control unit 220A, and a host controller 230A. The clock generator 210A may be used to generate a clock CLK used by the host 200A and/or eMMC 300A based on a maximum operating frequency control signal Fmax. The processing circuit 212 may be used to generate at least one of control signals, such as DEC, Fmax, HSE, CTR, VEN, and VREF_ON according to the operating mode of the eMMC system 100A, in response to a particular command CMD, and/or in response to a particular response RES. Here, "DEC" denotes a host differential clock enable signal, "HSE" a second selection signal, "CTR" a state control signal, "YEN" a host differential amplifier enable signal, and "VREF_ON" is a host reference voltage enable signal. In this context, the state control unit 220A may be used to generate a first selection signal SEL in response to the state control signal CTR.

The processing circuit 212 may be implemented using hardware, firmware and/or software capable of generating command(s) CMD, interpreting response(s) RES, and controlling an interrogation of information data stored in an Extended(EXT)_CSD register 371 of the eMMC 300A, as well as other conventionally understood data processing operation(s). The processing circuit 212 may be used to control the operation and inter-operation of the clock generator 201A, processing circuit 212, and host controller 230A.

The host controller 230A includes a data input/output (I/O) circuit 240A and a host I/O block 250A. The data I/O circuit 240A includes a write latch circuit 241, a read latch circuit 243, and a first selection circuit 245.

The write latch circuit 241 includes first write latches 241-O and second write latches 241-E. The first write latches 241-O may be used to latch odd numbered data bits of write data to be written to the flash memory 370A of the eMMC 300A in response to a rising edge of the clock CLK. The second write latches 241-E may be used to latch even numbered data bits of write data in response to a falling edge of the clock CLK.

The read latch circuit 243 includes first read latches 243-O and second latches 243-E. The first read latches 243-O may be used to latch odd numbered data bits of read data provided by the eMMC 300A in response to a rising edge of one of a read clock RCLK or the clock CLK as selected by the first selection circuit 245. The second read latches 243-E may be used to latch even numbered data bits of read data in response to a falling edge of one of the read clock RCLK or clock CLK.

In certain embodiments of the inventive concept, the first selection circuit 245 may be implemented using a multiplexer. The multiplexer may be used to communicate the clock CLK to the read latch circuit 243 in response to a first (or "low") level of a first selection signal SEL, or the return clock RCLK to the read latch circuit 243 in response to a first (or "high") selection signal SEL.

The host 200A illustrated in FIG. 5 includes the state control unit 220A and the first selection circuit 245. However, this need not always be the case, and either the state control unit 220A and/or the first selection circuit 245 may be omitted in other embodiments of the inventive concept. For example, the return clock RCLK may be directed applied to the read latch circuit 243.

In the embodiment illustrated in FIG. 5, certain additional signal lines (or bus(es)) are used to connect the eMMC 300A and the host 300A. These additional signal lines include a unidirectional complementary clock line 101-1 that communicates a complementary version (nCLK) of the clock CLK to the eMMC 300A, a unidirectional return clock line 104 that communicates a return clock signal RCLK to the host 200A, and a complementary return clock bus 104-1 that communicates a complementary return clock signal nRCK to the host 200A. The provision and use of these additional signal lines, corresponding channels, and associated signals may be understood upon consideration of pending U.S. patent application Ser. No. 14/025,879 filed on Sep. 13, 2013.

The host 200A may be used to communicate a hardware reset signal RST_n to the eMMC 300A via the reset line. The host 200A may also be used to generate I/O operating voltages VCCQ and VSSQ to be used in the host I/O block 250A and the eMMC I/O block 320A. These operating voltages may be communicated via the I/O operating voltages power line VCCQ/VSSQ. In certain embodiments of the inventive concept, a driver (e.g., a differential amplifier)

and a receiver (e.g., a differential amplifier) may be included in each one of the host I/O block 250A and the eMMC I/O block 320A that operate in relation to the I/O operating voltages VCCQ and VSSQ.

The eMMC system 100A further includes a reference voltage line 105 that communicates a reference voltage VREF to the eMMC 300A that may be generated using the I/O operating voltages VCCQ and VSSQ.

The host 200A may be used to generate core operating voltages VCC and VSS provided to the flash memory 370A via the core operating voltage power lines VCC/VSS.

In the embodiment of FIG. 5, the eMMC 300A includes an eMMC controller 310A and flash memory 370A. The eMMC controller 310A controls the exchange of data between the host 200A and flash memory 370A. The eMMC controller 310A includes an eMMC I/O block 320A, an eMMC host interface 330A, a CPU 340A, a memory 350A, and a flash interface 360A.

The eMMC host interface 330A receives the clock CLK and the command CMD via the eMMC I/O block 320A, generates the return clock RCLK based on the received clock CLK, transmits the return clock RCLK to the eMMC I/O block 320A, interprets the received command CMD, generates an appropriate response RES based on the interpretation result, and transmits the response RES and corresponding data generated based on the response RES to the eMMC I/O block 320A.

The operation of the CPU 340A and buffer memory 350A of the embodiment shown in FIG. 5 is similar to that of the operation of the CPU 335 and buffer memory 350 of the embodiment shown in FIG. 1.

Here again, the flash memory 370A is assumed to include the EXT_CSD register 371 capable of storing information regarding the operating modes, characteristics and properties of the eMMC 300A. The flash memory 370A may include the EXT_CSD register 371. As before, the EXT_CSD register 371 may be used to store the maximum operating frequency information. For example, the maximum operating frequency information may be stored in the VENDOR_SPECIFIC_FIELD field of the EXT_CSD register 371. This information may be obtained by the host 200A using the approach described above (e.g., using a SEND_EXT_CSD command CMD8).

Using the maximum operating frequency information, the clock generator 210A may generate the clock CLK having an appropriate frequency.

FIG. 6 is a table listing examples of device type field information that may be stored by a EXT_CSD register according to certain embodiments of the inventive concept. Referring to FIG. 6, the DEVICE_TYPE[196] field of the EXT_CSD register may be sued to define a type for the eMMC 300A. Only bits Bit 0 though Bit 5 of the DEVICE_TYPE[196] field are defined by JESD84-B451, for example. However, information regarding the eMMC 300A supporting DDR 400 may be stored using the DEVICE_TYPE[196] field according to certain embodiments of the inventive concept. For example, this particular information field may indicate a 200 MHz DDR mode at 1.8V (VCCQ=1.8V) using Bit 6, and 200 MHz DDR mode at 1.2V (VCCQ=1.2V) using Bit 7.

The contents of the DEVICE_TYPE[196] field of the EXT_CSD register 371 may be communicated from the eMMC 300A to the host 200A in response to the SEND_EXT_CSD command CMD8 communicated from the host 200A. Thus, the host 200A may determine whether the eMMC 300A supports DDR 400 by interrogating (e.g.,) Bit 6 or Bit 7 of the DEVICE_TYPE [196] field of the EXT_CSD register 371.

FIG. 7, inclusive of FIGS. 7A and 7B, illustrates exemplary HS_TIMING and HS_TIMING values. The HS_TIMING [185] field of the EXT_CSD register 371 may be used by the host 200A to select timing interface and driver strength. According to certain embodiments of the inventive concept, “0x3” may be added to the HS_TIMING[185] field.

If the host 200A sets the HS_TIMING[185] field to “1”, the eMMC 300A may change the timing of the eMMC 300A to a high speed interface timing, and if the host 200A sets the HS_TIMING[185] field to “2”, the eMMC 300A may change the timing of the eMMC 300A to HS200 interface timing. If the host 200A sets the HS_TIMING[185] field to “3”, the eMMC 300A may change the timing of the eMMC 300A to DDR 400 interface timing. Example embodiments of the DDR 400 interface timing will be described in the context of FIGS. 8, 9 10, and 11. That is, the host 200A may set a DDR 400 bit and the driver strength value in the HS_TIMING[185] field of EXT_CSD register by issuing a SWITCH command CMD6.

Figure 8:
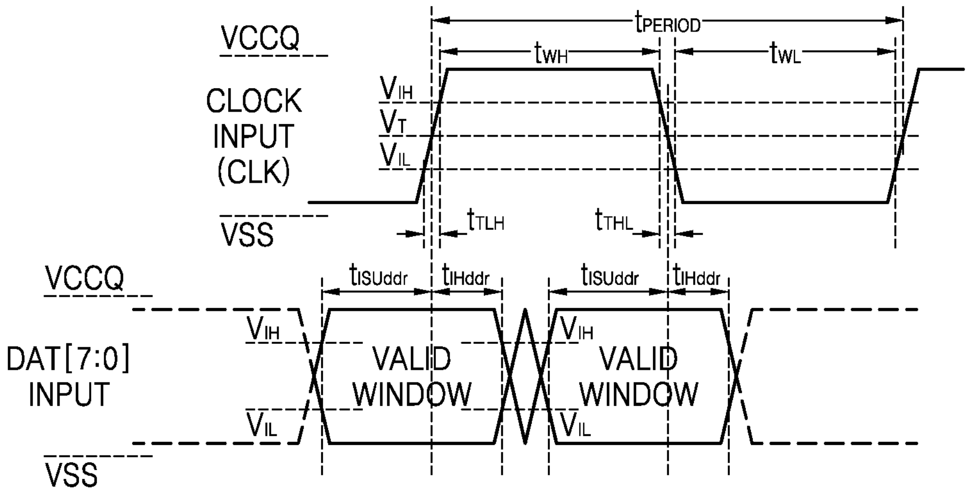
FIG. 8 is a timing diagram that illustrates DDR 400 device input timing according to certain embodiments of the inventive concept.
Figure 10:
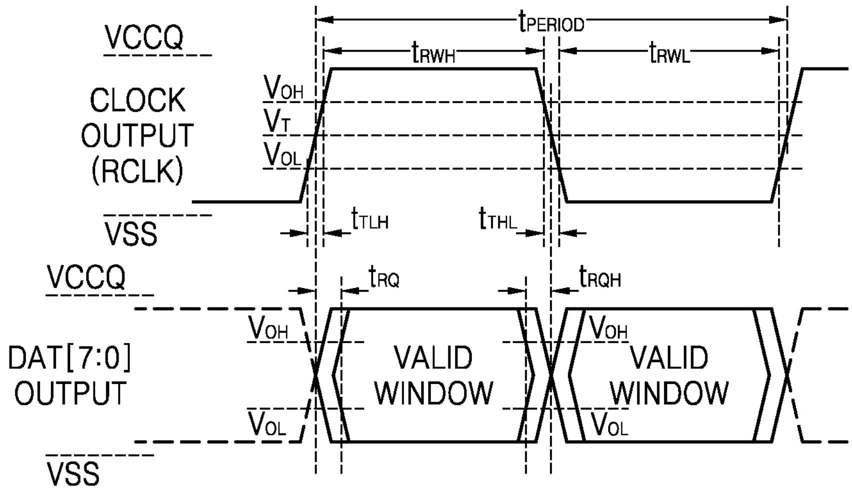
FIG. 10 is a timing diagram that illustrates DDR 400 device output timing according to certain embodiments of the inventive concept.

FIG. 8 is a DDR 400 device input timing diagram, and FIG. 9 is a table listing parameters for the DDR 400 device input timing diagram of FIG. 8. FIG. 10 is a DDR 400 device output timing diagram, and FIG. 11 is a table listing parameters for the DDR 400 device output timing diagram of FIG. 10.

Referring collectively to FIGS. 5, 6, 7, 8, 9, 10 and 11, it is assumed that the eMMC 300A supports DDR 400 and that an edge of the return clock RCLK and edge of the output data DAT[7:0] OUTPUT are synchronous.

The eMMC host interface 330A generates the return clock signal RCLK synchronized with output data DAT[7:0] OUTPUT by delaying the clock signal CLK for a predetermined time. Thus, the eMMC 300A reduces skew between the output data DAT[7:0] OUTPUT and the return clock signal RCLK to secure data valid window.

tRQ and tRQH are AC timing parameters about parallel data DAT[7:0] output to the host 200A and defines skew between the output data DAT[7:0] OUTPUT and the return clock signal RCLK.

The tRQ denotes output hold skew and the tRQH denotes output hold time. The tRQ is the limitation that needs to retain data until an edge of the return clock signal RCLK generates, and the TRQH is the limitation that needs to make data into normal data by the certain time after an edge of the return clock signal RCLK generated.

FIG. 12 is a table listing information describing a maximum operating frequency for a clock CLK in relation to DDR 400 that may be stored in the VENDOR_SPECIFIC_FIELD field of the EX_CSD register 380 and 371. Referring to the foregoing embodiments, information describing the maximum operating frequency of the clock CLK communicated to the eMMC 300A supporting DDR 400 is provided in the VENDOR_SPECIFIC_FIELD field of the EXT_CSD register 371 (e.g., a CSD slice[122]).

In this regard, the host 200A may communicate a command CMD requesting the information describing the maximum operating frequency for the clock CLK from the eMMC 300A. And in response, the eMMC 300A may communicate the information stored in the VENDOR_SPECIFIC_FIELD field of the EXT_CSD register 371.

The processor 212 of the host 200A may be used to interpret the information stored in the CSD slice[122] and transmits a corresponding maximum operating frequency control signal Fmax to the clock generator 210. Thus, the clock generator 210 may be used to generate the clock signal CLK having prescribed maximum operating frequency (e.g., one of 52 MHz, 100 MHz, 133 MHz, 166 MHz, and 200 MHz) corresponding to the type specifications of FIG. 12.

Figure 13:
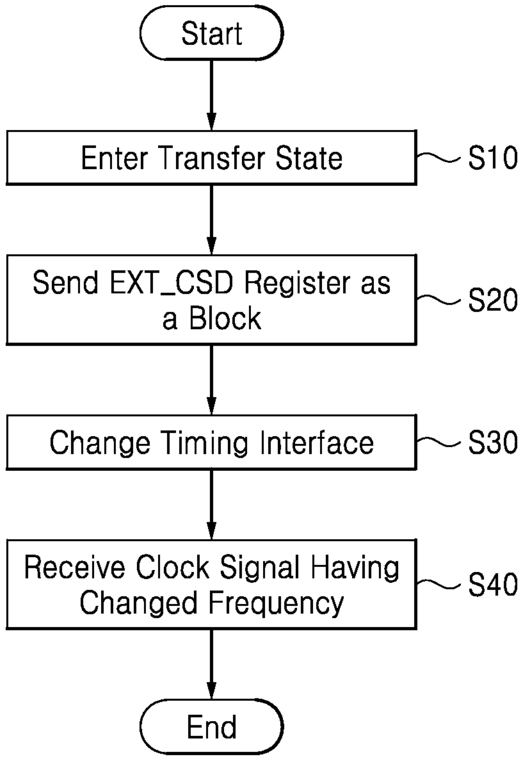
FIG. 13 is a flow chart summarizing one possible method of operating for the eMMC system of FIGS. 1 and 5.

FIG. 13 is a flow chart summarizing one possible method of operating an eMMC system according to certain embodiments of the inventive concept. Referring to FIGS. 1, 4, 5 and 13, it is assumed that the eMMC 300/300A is configured to operate in response to a clock CLK having a first frequency. Then, is assumed that in response to a SELECT command CMD 7 command received from the host 200/200A, the eMMC 300/300A transitions from a stand-by state (stby) to a transfer state (trans) (S10).

Then, the host 200/200A is assumed to communicates a SEND_EXT_CSD command CMD8 to the eMMC 300/300A, causing the eMMC 300/300A to transition from the transfer state (trans) to the transmit state, and within this mode communicating the contents of the EXT_CSD register 380/371 to the host 200 or 200A as a block of data via the data bus 103 (S20). The information stored in the EXT_CSD register 380/371 includes maximum operating frequency information for the eMMC 300/300A.

After the host 200/200A receives and interprets the information stored in the EXT_CSD register 380/371, it may send the SWITCH command CMD6 (S30) to the eMMC 300/300A causing the eMMC 300/300A to change its interface timing. Once the interface timing for the eMMC 300/300A has been changed, the eMMC 300/300A is ready to receive the clock signal CLK having a second frequency from the host 200/200A (S40).

Figure 14:
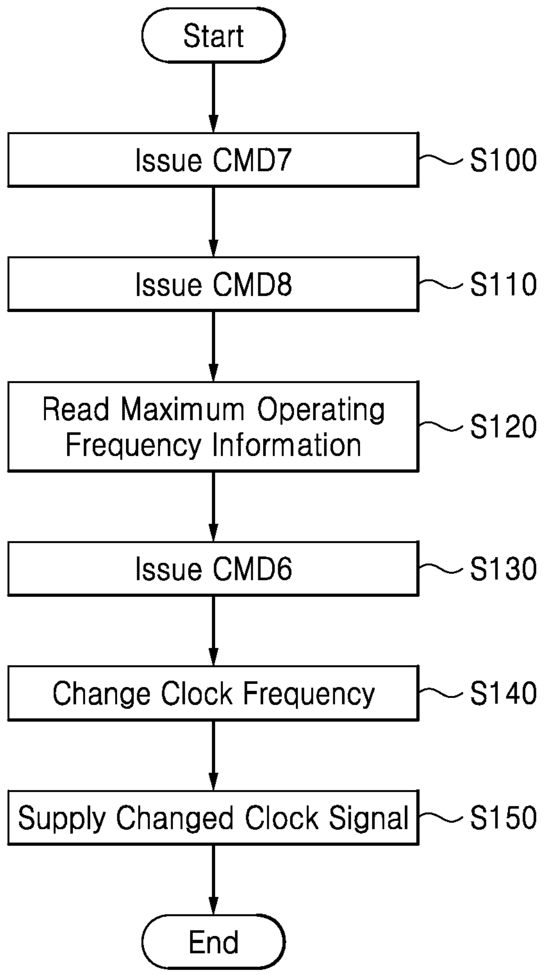
FIG. 14 is a flow chart summarizing another possible method of operating for the eMMC system of FIGS. 1 and 5.

FIG. 14 is a flow chart summarizing another possible method of operating the eMMC system 100/100A of FIGS. 1 and 5. Referring to FIGS. 1, 4, 5, and 14, the host 200/200A transmits the SELECT command CMD7 to the eMMC 300/300A to change the eMMC 300/300A from the stand-by mode (stby) to the transfer state (trans) (S100). Then, the host 200/200A transmits the SEND_EXT_CSD command CMD8 to the eMMC 300/300A to read the maximum operating frequency information for the eMMC 300/300A (S110). Then, as described above, the host 200/200A reads the maximum operating frequency information provided by the eMMC 300 (S120).

The host 200A shown in FIG. 5, for example, may transmit the SEND_EXT_CSD command CMD8 to the eMMC 300A in order to determine whether or not the eMMC 300A supports high-speed DDR 400 using information stored in the DEVICE_TYPE[196] of the EXT_CSD register 371 (e.g., Bit 6 or Bit 7 of FIG. 6).

Where the eMMC 300A does not support high-speed DDR 400 or performs only write operations in DDR 400, the eMMC 300A may not switch to the high-speed DDR 400. However, where the eMMC 300A supports high-speed DDR 400, the host 200A is able to read a maximum operating frequency for the clock CLK associated with DDR 400 as provided by the VENDOR_SPECIFIC_FIELD field of the EXT_CSD register 371.

The host 200/200A may then communicate the SWITCH command CMD6 to the eMMC 300/300A to switch the eMMC 300/300A to the another operating frequency (e.g., HS200 mode or DDR400 mode) (S130). The host 200/200A sets the value of the HS_TIMING[185] field of the EXT_CSD register 380/371 as 2 (for the HS200 mode) or 3 (for the DDR 400 mode) to switch the eMMC 300/300A to the HS200 mode or the DDR400 mode.

The host 200/200A changes the frequency of the clock CLK according to the maximum operating frequency information (S140). The host 200/200A may then communicate the clock signal CLK having the second (changed) frequency to the eMMC 300/300A (S150).

Figure 15:
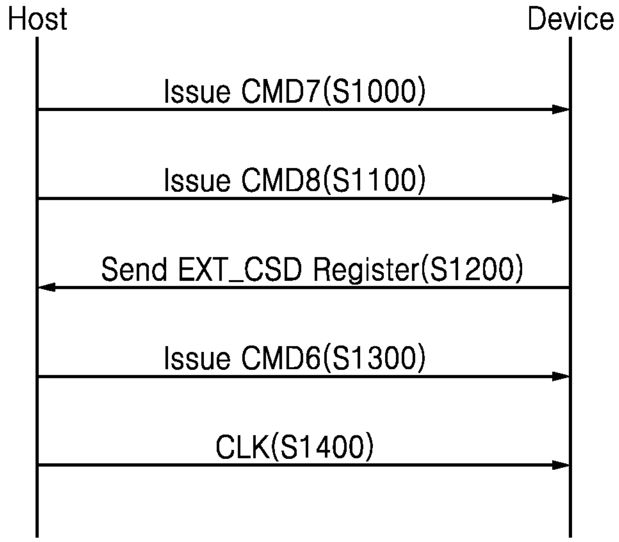
FIG. 15 is an operating diagram illustrating an exchange of commands and responses between a host and eMMC in the eMMC systems of FIGS. 1 and 5.

FIG. 15 is an operating diagram illustrating an exchange of commands and responses between the host 200/200A and eMMC 300/300A of FIGS. 1 and 5. Referring to FIGS. 1, 5 and 15, the host 200/200A transmits the SELECT command CMD7 to the eMMC 300/300A to transition the eMMC 300/300A to the transfer state (trans) (S1000). The eMMC 300/300A transitions from the stand-by state (stby) to the transfer state (trans) in response to the SELECT command CMD7 received from the host 200/200A.

The host 200/200A then communicates the SEND_EXT_CSD command CMD8 to the eMMC 300/300A to read maximum operating frequency information stored in the eMMC 300/300A (S1100), and the host 200/200A reads the maximum operating frequency information (S1200).

The host 200/200A communicates the SWITCH command CMD6 to the eMMC 300/300A to switch the eMMC 300/300A to the HS200 mode or DDR400 mode (S1300). The host 200/200A changes the frequency of the clock CLK in accordance with the maximum operating frequency information, and transmits the clock CLK to the eMMC 300/300A (S1400).

As described in the context of the foregoing embodiments, a host controlling the operation of an eMMC in an eMMC system according to embodiments of the inventive concept may read maximum operating frequency information and change a clock speed without necessarily performing a conventional tuning process. This approach reduces the overhead processing required of the host.

While the inventive concept has been particularly shown and described with reference to exemplary embodiments thereof, it will be understood by those of ordinary skill in the art that various changes in forms and details may be made therein without departing from the scope of the inventive concept as defined by the following claims.

What is claimed is:

1. An embedded multimedia card (eMMC) comprising:

flash memory including an extended card specific data (CSD) register ("EXT_CSD register"); and an eMMC controller that controls operation of the flash memory, wherein the eMMC controller is configured to receive a clock from a host via a clock line, receive a SEND_EXT_CSD command from the host via a command line, and provide the host with eMMC information stored in the EXT_CSD register via a data bus in response to the SEND_EXT_CSD command, the eMMC information including maximum operating frequency information for the eMMC.

2. The eMMC of claim 1, wherein the clock has a first frequency before the information stored in the EXT_CSD register is provided to the host and a second frequency different from the first frequency after the information stored in the EXT_CSD register is provided to the host.

3. The eMMC of claim 2, wherein the EXT_CSD register defines the information stored in the EXT_CSD register according to a least one data field, and the at least one data field includes a VENDOR_SPECIFIC_FIELD field that stores the maximum operating frequency information.

4. An embedded multimedia card (eMMC) system comprising:

an eMMC comprising flash memory and an extended card specific data (CSD) register ("EXT_CSD register") that stores information including maximum operating frequency information for the eMMC; and a host that controls operation of the eMMC and comprises:

a clock generator that generates a clock provided to the eMMC; and a host controller that generates a maximum operating frequency control signal applied to the clock generator to determine a frequency of the clock, wherein the host controller is configured to send a SEND_EXT_CSD command to the eMMC and receive the maximum operating frequency information from the eMMC in response to the SEND_EXT_CSD command, and the maximum operating frequency control signal is generated in accordance with the maximum operating frequency information.

5. The eMMC system of claim 4, wherein the eMMC further comprises:

an eMMC controller having an eMMC input/output (I/O) interface that receives the clock and the SEND_EXT_CSD command from the host, a control logic block that receives the clock and the SEND_EXT_CSD command from the eMMC I/O interface, and a flash I/O interface that receives the maximum operating frequency information from the flash memory.

6. The eMMC system of claim 5, wherein the eMMC further comprises;

a clock channel that receives the clock from the host via a clock line;

a command channel that receives the SEND_EXT_CSD command from the host via a command line;

a plurality of data channels that transmit data corresponding to the information stored in the EXT_CSD register to the host; and a return clock channel that transmits a return clock to the host synchronously with the data via a return clock line separate from the clock line, the command line, and the data lines.

7. The eMMC system of claim 5, wherein the eMMC controller further comprises:

a buffer memory; and a Central Processing Unit (CPU) that in response to the SEND_EXT_CSD command reads data corresponding to the information stored in the EXT_CSD register and temporarily stores the data in the buffer memory.

8. The eMMC system of claim 7, wherein the eMMC further comprises;

a clock channel that receives the clock from the host via a clock line;

a command channel that receives the SEND_EXT_CSD command from the host via a command line;

a plurality of data channels that transmit data corresponding to the information stored in the EXT_CSD register from the buffer memory to the host; and a return clock channel that transmits a return clock to the host synchronously with the data via a return clock line separate from the clock line, the command line, and the data lines.

9. The eMMC system of claim 5, wherein the host further comprises:

a host I/O interface that receives the data corresponding to the information stored in the EXT_CSD register; and an input circuit that receives the data corresponding to the information stored in the EXT_CSD register from the host I/O interface and converts the data corresponding to the information stored in the EXT_CSD register into the maximum operating frequency control signal.

10. A method for operating an eMMC system including an embedded multimedia card (eMMC) and a host, the method comprising:

providing a clock having a first frequency from the host to the eMMC;

communicating a SEND_EXT_CSD command from the host to the eMMC;

in response to the SEND_EXT_CSD command, reading information data from an extended card specific data (CSD) register ("EXT_CSD register") disposed in the eMMC and communicating the information data to the host; and changing the frequency of the clock from the first frequency to a second frequency different from the first frequency and operating the flash memory in response to the clock having the second frequency, wherein the EXT_CSD register arranges the eMMC data according to a least one data field, and the at least one data field includes a VENDOR_SPECIFIC_FIELD field that stores data defining the maximum operating frequency for the clock.

11. The method of claim 10, wherein the eMMC data includes data defining a maximum operating frequency for the clock in relation to a selected operating mode for the eMMC.

12. The method of claim 10, wherein the selected operating mode is DDR 400.

13. The method of claim 10, wherein the host comprises a clock generator, and the method further comprises:

generating a maximum operating frequency control signal applied to the clock generator to determine a frequency of the clock; and deriving the maximum operating frequency control signal from the information data.

14. The method of claim 10, wherein the the EXT_CSD register is disposed in the flash memory.

15. A method of operating an eMMC system including an embedded multimedia card (eMMC) and a host, the method comprising:

providing a clock having a first frequency from the host to the eMMC;

communicating a SEND_EXT_CSD command from the host to the eMMC;

in response to the SEND_EXT_CSD command, reading information data from an extended card specific data (CSD) register ("EXT_CSD register") disposed in the eMMC and communicating the information data to the host;

changing the frequency of the clock from the first frequency to a second frequency different from the first frequency;

communicating a SWITCH command from the host to the eMMC; and changing timing interface between the eMMC and the host in response to the SWITCH command from a first timing interface to a second timing interface.

16. The method of claim 15, wherein at least one of the first timing interface and second timing interface is compatible with an HS200 operating mode for the eMMC.

17. The method of claim 15, wherein at least one of the first timing interface and second timing interface is compatible with a DDR 400 operating mode for the eMMC.

* * * * *